United States Patent [19]

Lenz

[11] Patent Number: 5,780,619
[45] Date of Patent: Jul. 14, 1998

[54] STARCH GRAFT POLY(METH)ACRYLATE BLAST MEDIA

[75] Inventor: Ruben Lenz, Laval Sur le Lac, Canada

[73] Assignee: U.S. Technology Corporation, Canton, Ohio

[21] Appl. No.: 670,894

[22] Filed: Jun. 26, 1996

[51] Int. Cl.$^6$ .................................. C07H 1/00; C07H 1/06
[52] U.S. Cl. ................... 536/123.1; 536/20; 536/21; 536/30; 536/45; 536/46; 536/47; 536/124; 536/126; 536/128; 428/532; 527/300; 527/313; 134/17; 134/38; 51/298; 51/320
[58] Field of Search .................. 134/17, 38; 51/298, 51/320; 536/20, 21, 30, 45, 46, 47, 123.1, 124, 126, 128, 55.1; 527/300, 313, 314; 428/532

[56] References Cited

U.S. PATENT DOCUMENTS

| | | |
|---|---|---|
| 4,731,125 | 3/1988 | Carr. |
| 4,947,591 | 8/1990 | Risley. |
| 5,003,022 | 3/1991 | Nguyen et al. ............ 527/300 |
| 5,066,335 | 11/1991 | Lane et al.. |
| 5,112,406 | 5/1992 | Lajoie et al.. |
| 5,147,466 | 9/1992 | Ohmori et al.. |
| 5,160,547 | 11/1992 | Kerschner et al.. |
| 5,188,666 | 2/1993 | Boccardo. |
| 5,221,296 | 6/1993 | Schwerzel et al.. |
| 5,308,404 | 5/1994 | Yam et al.. |
| 5,316,587 | 5/1994 | Yam et al.. |
| 5,322,532 | 6/1994 | Kurtz. |
| 5,360,903 | 11/1994 | Lane et al.. |
| 5,367,068 | 11/1994 | Lane et al.. |
| 5,367,838 | 11/1994 | Visaisouk et al.. |
| 5,380,347 | 1/1995 | Winston et al.. |
| 5,427,710 | 6/1995 | Stevens. |

*Primary Examiner*—James O. Wilson
*Attorney, Agent, or Firm*—Oldham & Oldham Co., LPA

[57] ABSTRACT

The invention discloses a starch graft poly(meth)acrylate blast media which is effective in paint removal. The media is superior to a physical blend of the components (i.e., starch and acrylic polymers) and to either a starch polymer or an acrylic polymer used singly. The hardness of the media is between 65-90 Shore D.

18 Claims, 2 Drawing Sheets

STARCH GRAFT POLY(METH)ACRYLATE BLAST MEDIA

TECHNICAL FIELD

The invention described herein pertains generally to chemically modified starch blast media for use in coating removal applications. More specifically, the invention relates to polysaccharide polymers to which are grafted polymethyl methacrylate oligomers. The invention relates to a novel method of preparation of the polymethyl methacrylate graft copolymer polysaccharides in which the grafting component is oligomeric in nature.

BACKGROUND OF THE INVENTION

Various methodologies and compositions have been taught in the prior art regarding the stripping of coatings from an underlying surface. A non-exhaustive list of such technologies would include:

U.S. Pat. No. 4,731,125 which discloses a process whereby paint is removed from composite by blasting with urea-formaldehyde plastic particles having a Mohs scale hardness of 2.5–3.5 with a flow at a pressure of 40 lb/in$^2$;

U.S. Pat. No. 4,947,591 which discloses a process whereby paint is removed by impact with particles of an acrylic-containing unsaturated polyester where the particles are ground from a cured mass so as to have at least 40 facets per particle;

U.S. Pat. No. 5,112,406 which discloses a process for removing coatings from sensitive hard surface metal composite surfaces, masonry, stucco, plaster or wood by blasting the surfaces with a high velocity fluid stream containing water soluble crystalline sodium sulfate particles admixed with a hydrophobic silica or hydrophobic polysiloxane flow/anti-caking agent;

U.S. Pat. No. 5,160,547 which discloses a process where the surfaces are blasted with a water saturated compressed air stream under pressures of 10–150 psi using sodium bicarbonate particles having particle sizes of 250–300 microns in admixture with a hydrophobic silica flow/anti-caking agent;

U.S. Pat. No. 5,147,466 which discloses fine particles or oil films which are cleaned from the surface by bombarding it with fine frozen particles of water or other liquids such as glycerin carried in a stream of nitrogen cooled air under relatively low pressure;

U.S. Pat. No. 5,221,296 which discloses abrasives based on finely divided abrasive particles bonded to one another and/or to a support by means of a binder, where the binder is the solid component of an aqueous polymer dispersion which is obtainable by polymerizing unsaturated monomers which can be polymerized by means of free radicals, in the aqueous phase of a monosaccharide, oligosaccharide, polysaccharide, oxidatively, hydrolytically and/or enzymatically degraded polysaccharide, chemically modified monosaccharide, oligosaccharide or polysaccharide or a mixture of the above;

U.S. Pat. No. 5,308,404 which discloses a process by which contaminants are removed from substrates by blast clearing with a media containing abrasive particles obtained by compacting fine particles of the abrasive into larger particles having a hardness of 2–5 Mohs, and wherein the abrasive can be water (soluble or insoluble) and is preferably sodium bicarbonate or calcium carbonate;

U.S. Pat. No. 5,316,587 which discloses blast cleaning a solid surface which includes the steps of propelling an abrasive blast medium against a solid surface using a water-containing pressurized fluid stream to strip contaminants from the surface wherein the blast medium comprises water soluble abrasive particles and a surfactant;

U.S. Pat. No. 5,322,532 which discloses a process for removing contaminants from a substrate comprises blast cleaning the substrate with composite abrasive particles formed by agglomerating particles of sodium bicarbonate with an aqueous binder solution of sodium carbonate;

U.S. Pat. No. 5,360,903 and U.S. Pat. No. 5,367,068 which disclose a process whereby a surface is treated with particles of a glassy polysaccharide wherein the apparent hardness of the granules is between that of the coating and of the substrate and the granules are of starch, preferably wheat starch, with dextrose equivalent less than 10, preferably unhydrolyzed;

U.S. Pat. No. 5,367,838 which discloses a method wherein ice particles are supplied to the apparatus from an ice supply and a fluidizing device provides a fluidizing flow of the ice particles entrained in cold dry air;

U.S. Pat. No. 5,380,347 which discloses the preparation of blast media useful in stripping contaminants from solid surfaces which comprises forming a surfactant-clathrate compound comprising a surfactant and a water soluble compound having clathration properties and incorporating the compound with abrasive particles; and U.S. Pat. No. 5,427,710 which discloses a composition useful for removing polymeric coatings from flexible and inflexible surfaces which consists essentially of a conjugated terpene, an alcohol, a non-conjugated terpene, a surfactant, and an organo-clay rheological additive.

While all of the above references have contributed to the science of blast media development, there still exists a need for a product which quickly removed paint from a surface, yet which does not harm the surface through the removal process.

SUMMARY OF THE INVENTION

In accordance with the present invention, there is provided a chemically modified polysaccharide blast media for use in coating removal applications.

It is an object of this invention to provide a polysaccharide polymer onto which is grafted a poly(meth)acrylate oligomer useful in coating removal applications.

It is another object of this invention to provide a blast media with coating removal rates similar to Type V media (thermoset methyl methacrylate polymer in abrasive form) for commercial aircraft fuselage paint removal.

It is still another object of this invention to provide a blast media suitable for use on thin skin clad aluminum and delicate composite panels.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
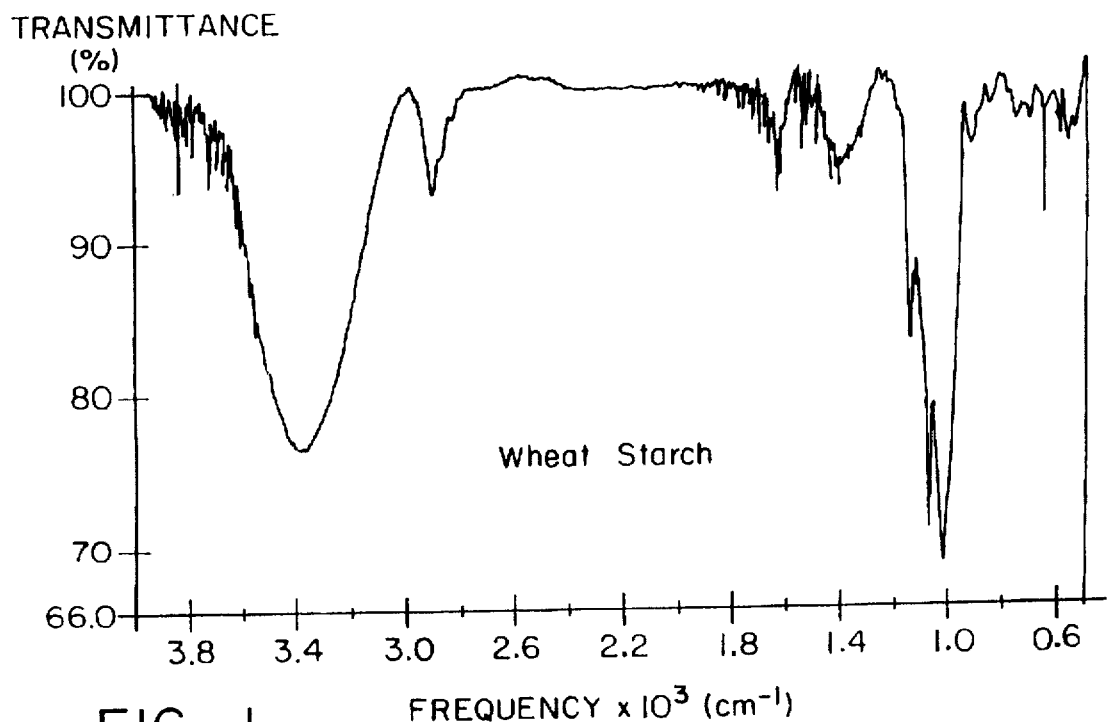
FIG. 1 is an IR spectra of wheat starch (prior art) blast media.
Figure 2:
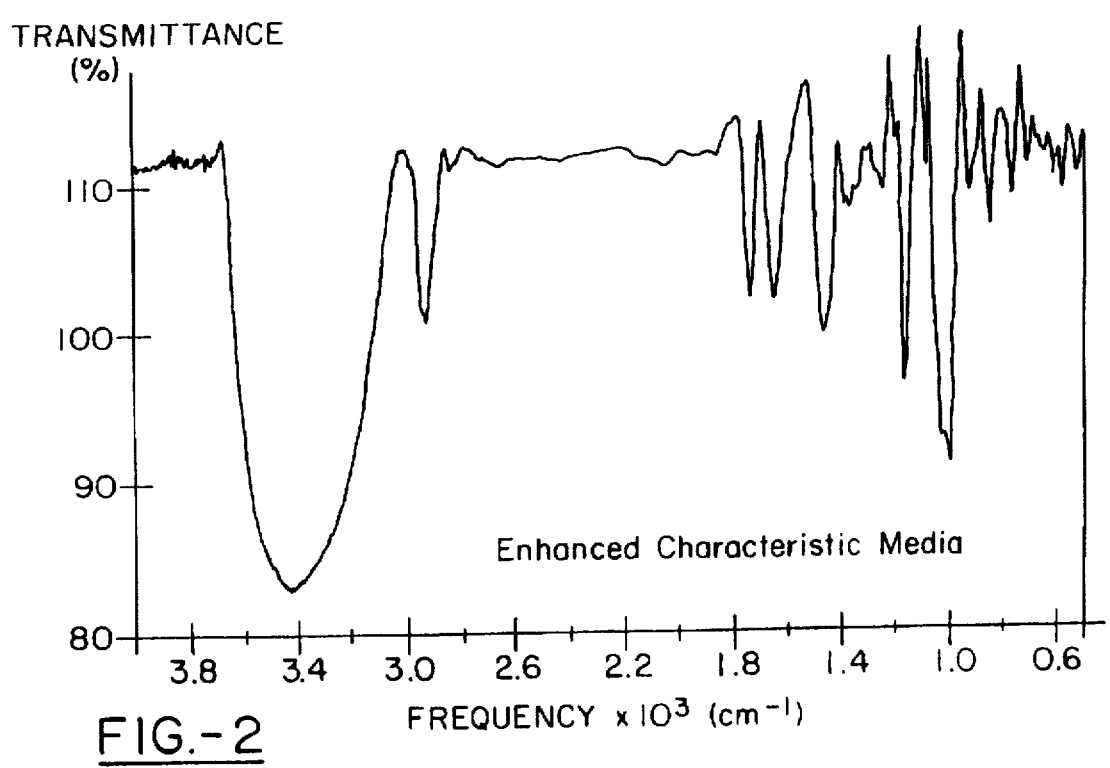
FIG. 2 is an IR spectra of the polysaccharide-g-polymethyl methacrylate blast media of the present invention.
Figure 3:
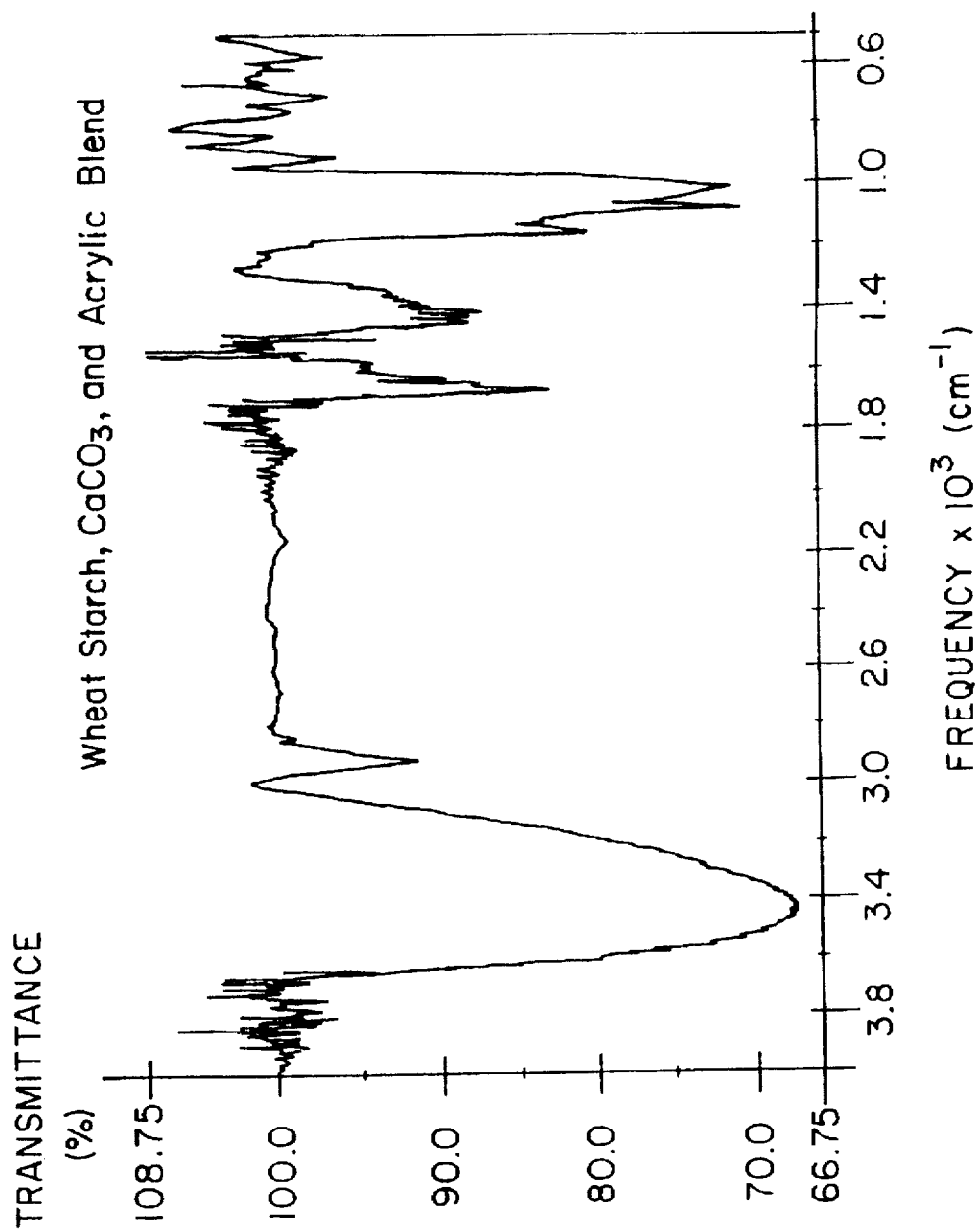
FIG. 3 is an IR spectrum of a blend of wheat starch, CaCO₃ and grafted acrylic oligomers.

Referring now to the drawings wherein the showings are for purposes of illustrating the preferred embodiment of the invention only and not for purposes of limiting the same, a comparison of FIGS. 1 and 2 show the absence of two broad multiplet peaks at 1400 to 1900 wave numbers, which are present in all starch IR spectrographs. These peaks represent the numerous bending and scissoring which are possible within the secondary starch structure. The product of this invention is devoid of these peaks which have been replaced by several distinct peaks, indicating a fundamental structural change. An additional comparison with the IR spectra of FIG. 3, a simple combination of the components once again yields a spectra comprised of the two broad multiplet peaks at 1400 to 1900 wave numbers, a result more similar to that of FIG. 1 (prior art) than FIG. 2, providing further support for the chemical modification of the reactants.

The invention has particular applicability for use with commercial aircraft fuselages and achieves coating removal rates similar to Type V media. These materials are typically thin skin clad aluminum and delicate composite materials. Only one material, ENVIROSTRIP™, starch blast media, is approved by the original equipment manufacturer (Boeing) for unlimited use. However, the coating removal rates of the ENVIROSTRIP™, starch blast media product is generally deemed to be too slow for most airlines and contractors to use.

The best mode for carrying out the invention will now be described for the purposes of illustrating the best mode known to the applicant at the time. The examples are illustrative only and not meant to limit the invention, as measured by the scope and spirit of the claims.

EXAMPLE #1

A slurry was prepared by dispersing 50 g of dry basis unmodified potato starch (17.7% water content), 0.3 g CaCO₃, 13 g of an acrylic slurry (Algloss heat reactive overcoat, 38% solids having a viscosity of 20 cps at 10% solids), and water. The total slurry volume was 150 mL. The slurry was cooked in a boiling water bath for 10 minutes and then dried in an oven preheated to 100° C. The resulting product was clear, colorless and plastic-like and further characterized in Table 6.

EXAMPLE #2

A slurry was prepared by dispersing 61 g of dry basis unmodified potato starch, (17.7% water content), 0.3 g CaCO₃, 5 g. of a water-soluble acrylic polymer (Colsize VR having a viscosity of 100 cps at 10% solids), and water. The total slurry volume was 150 mL. The slurry was cooked in a boiling water bath for 10 minutes and then dried in an oven preheated to 100° C. The resulting product was clear, colorless and plastic-like and further characterized in Table 6.

EXAMPLE #3

A slurry was prepared by dispersing 50 g of dry basis unmodified potato starch, (17.7% water content), 0.3 g CaCO₃, 5 g of acrylic powder ground to a particle size smaller than 60 mesh, and water. The total slurry volume was 150 mL. The slurry was cooked in a boiling water bath for 10 minutes and then dried in an oven preheated to 100° C. The resulting product was clear, colorless and plastic-like and further characterized in Table 6.

EXAMPLE #4

A slurry was prepared by dispersing 30 g of dry basis unmodified potato starch, (17.7% water content), 0.15 g CaCO₃, 3 g of acrylic powder ground to a particle size smaller than 60 mesh, and water. The total slurry volume was 150 mL. The slurry was cooked in a boiling water bath for 10 minutes and then dried in an oven preheated to 100° C. The resulting product was clear, colorless and plastic-like and further characterized in Table 6.

EXAMPLE #5

A slurry was prepared by dispersing 30 g of dry basis unmodified wheat starch (8.6% water content—ADM Ogilvie—Montreal), 0.15 g CaCO₃, 3 g of acrylic powder ground to a particle size smaller than 60 mesh, and water. The total slurry volume was 150 mL. The slurry was cooked in a boiling water bath for 10 minutes and then dried in an oven preheated to 100° C. The resulting product was brown-yellow and plastic-like and further characterized in Table 6.

EXAMPLE #6

A slurry was prepared by dispersing 30 g of dry basis unmodified corn starch (10% water—Nacan—New Jersey), 3 g of acrylic/water emulsion (Algloss heat reactive overcoat, 38% solids), and water. The total slurry volume was 150 mL. The slurry was cooked in a boiling water bath for 10 minutes and then dried in an oven preheated to 100° C. The resulting product was cream colored and plastic-like and further characterized in Table 6.

EXAMPLE #7

A mixture of 2 g dry basis unmodified potato starch (17.7% water content), 0.02 g CaCO₃, 0.2 g of an acrylic/water emulsion (Algloss heat reactive overcoat, 38% solids), and 0.5 g water. The ingredients were thoroughly mixed and placed into an aluminum form 1.5 cm. in diameter, 3 mm in thickness and having an aluminum lid. The form was placed into a 200° C. oil bath for 10 minutes. The form and its contents were subsequently quenched in a cold water bath. The resulting product was clear, colorless and plastic-like and further characterized in Table 6.

EXAMPLE #8

A mixture of 2 g dry basis unmodified wheat starch (8.6% water—ADM Ogilvie—Montreal), 0.02 g CaCO₃, 0.2 g of a water-soluble acrylic (Alcomer 507), and 0.75 g water. The ingredients were thoroughly mixed and placed into an aluminum form 1.5 cm. in diameter, 3 mm in thickness and having an aluminum lid. The form was placed into a 200° C. oil bath for 10 minutes. The form and its contents were subsequently quenched in a cold water bath. The resulting product was pearl colored and plastic-like and further characterized in Table 6.

EXAMPLE #9

A mixture of 2 g dry basis unmodified corn starch, (10% water—Nacan—New Jersey), 0.02 g CaCO₃, 0.2 g of ground acrylic powder ground to a particle size smaller than 60 mesh, and 0.8 g water. The ingredients were thoroughly mixed and placed into an aluminum form 1.5 cm. in diameter, 3 mm in thickness and having an aluminum lid. The form was placed into a 200° C. oil bath for 10 minutes. The form and its contents were subsequently quenched in a cold water bath. The resulting product was beige colored and plastic-like and further characterized in Table 6.

EXAMPLE #10

A Buss-Kneader with a 500 mm screw diameter and a processing barrel length of about 1 m was used. The processing barrel was equipped with 3 temperature zones ($z1$, $z2$ & $z3$). The processing screw was equipped with one temperature zone ($z4$), the crosshead and screw were equipped with one temperature zone ($z5$) and the die was equipped with one temperature zone ($z6$). The first zone was the feed zone adapted to receive the dry and liquid feeds of the various raw materials used in this example. The second zone was the mixing and heating zone incorporating mixing pins. The third and fourth zones contained conveying and/or compressing elements. The die contains 40 2 mm holes. A face cutter was used to cut the extrudate as it exited from the die plate. The extrudate was cut into pellets about 3 mm in length.

A blend of wheat starch (~90% dry basis by weight), acrylic powder ground to below 60 mesh (~10% basis by weight) and $CaCO_3$ (~0.5% basis by weight) was feed into the extruder along with water at a throughput rate of 300 lbs/hr. The screw speed was maintained at 70 rpm and the crosshead speed was maintained at 50 rpm. The temperature was controlled by maintaining each of the zones at the following temperatures as shown Table 6.

TABLE 1

Extrusion Temperatures for Example #10

| Zone | $z^1$ | $z^2$ | $z^3$ | $z^4$ | $z^5$ | $z^6$ |
|---|---|---|---|---|---|---|
| Temperature (°C.) | 20 | 90 | 110 | 90 | 110 | 110 |

These extrusion conditions resulted in a pearl colored, plastic like product having a temperature at the die of 118° C. and a die pressure of 200 psi.

EXAMPLE #11

A Buss-Kneader with a 50 mm screw diameter and a processing barrel length of about 1 m was used. The processing barrel was equipped with 3 temperature zones ($z1$, $z2$ & $z3$). The processing screw was controlled by zone 3, the crosshead and screw were equipped with one temperature zone ($z4$) and the die was equipped with one temperature zone ($z5$). The first zone was the feed zone adapted to receive the dry and liquid feeds of the various raw materials used in this example. The second zone was the mixing and heating zone incorporating mixing pins. The third and fourth zones contained conveying and/or compressing elements. The die contained two 5 mm holes. The extrudate was cut into pellets about 5 mm in length using a strand cutter.

A blend of wheat starch (~90% dry basis by weight), acrylic powder ground to below 60 mesh (~10% basis by weight) and $CaCO_3$ (~0.5% basis by weight) was feed into the extruder along with water at a throughput rate of 20 lbs/hr. The screw speed was maintained at 70 rpm and the crosshead speed was maintained at 50 rpm. The temperature was controlled by maintaining each of the zones at the following temperatures as shown in Table 2.

TABLE 2

Extrusion Temperatures for Example #11

| Zone | $z^1$ | $z^2$ | $z^3$ | $z^4$ | $z^5$ |
|---|---|---|---|---|---|
| Temperature (°C.) | 80 | 110 | 110 | 110 | 110 |

These extrusion conditions resulted in a pearl colored, plastic like product having a temperature at the die of 118° C. and a die pressure of 200 psi.

EXAMPLE #12

The solid product of Example #1 was ground using a coffee grinder. After 5 seconds, the grind was analyzed and then ground for an additional 5 seconds. The grind was again analyzed and ground for a final 5 seconds, after which the grind was also analyzed. The particle size distribution was as follows as shown in Table 3.

TABLE 3

Particle Size of Example #1 Treated According to Example #12

| Particle Size | % weight after grinding | | | |
|---|---|---|---|---|
| Grinding Time | 0 sec. | 5 sec. | 10 sec. | 15 sec. |
| original size | 100 | 95 | 80 | 60 |
| >12 mesh | 0 | 5 | 15 | 30 |
| <12 mesh | 0 | 0 | 5 | 10 |

As shown in table 3, the synthesized material is a solid, which must be ground into a useful size for use as a blast media. After five seconds, 95% of the original material remained in solid chunk form, and 5% of the material was retained on a 12 mesh screen. After 10 seconds, 15% of the material was retained on a 12 mesh screen and 5% passed through the screen. Similarly, after 15 seconds, 40% of the material had been broken from the original material and 30% was retained on the 12 mesh screen and 10% passed through the screen. The experiment is a semi-quantitative measure of the integrity of the particle as synthesized.

EXAMPLE #13

The product made in Example #3 was ground using a coffee grinder. After 5 seconds, the grind was analyzed and then ground for an additional 5 seconds. The grind was again analyzed and ground for a final 5 seconds, after which the grind was also analyzed. The particle size distribution was as follows in Table 4.

TABLE 4

Particles Size Distribution of Example #3 Treated According to Example #13

| Particle Size | % weight after grinding | | | |
|---|---|---|---|---|
| Grinding Time | 0 sec. | 5 sec. | 10 sec. | 15 sec. |
| original size | 100 | 95 | 60 | 15 |
| >12 mesh | 0 | 5 | 20 | 50 |
| <12 mesh | 0 | 0 | 20 | 35 |

A comparison of Tables 3 and 4 shows that the material made in example #3 breaks down easier than the material made in example #1. This conclusion is confirmed in Table 6.

EXAMPLE #14

The product made in Example #10 was ground using a hammer mill, the particle originating as a pellet. The hammer mill was operated without screens. After grinding, the particles were screened using a 10 mesh screen and the oversized particles were ground again. Less than 5% of the product passed through the 10 mesh screen after the first pass through the mill. The product was ground until all of the particles passed through the 10 mesh screen. The final particle size distribution was as follows in Table 5.

TABLE 5

Particle Size Distribution of Example #10 Treated According to Example #13

| Particle Size | 12 | 20 | 30 | 60 | pan |
|---|---|---|---|---|---|
| % by weight retained on screen | 0 | 80 | 15 | 5 | 1 |

The following comparisons of physical properties between the products described here, conventional plastic media, and the product described in U.S. Pat. Nos. 5,367,068; 5,360,903 and 5,066,355 (ENVIROSTRIP™, starch blase media) are compared and contrasted in Table 6.

TABLE 6

Comparison of Physical Properties of Example #10, Plastic Type V Abrasive, Starch Abrasive (ENVIROSTRIP ™ Starch blast media), and a Blend of Ingredients

| Product | Breakdown Rate | Hardness Shore D | Coating Removal Rate | Water Uptake Rate |
|---|---|---|---|---|
| Ex. #1 | <1 | 77 | — | 1.15 |
| Ex. #2 | 6 | 77 | — | 0.85 |
| Ex. #3 | 5 | 74 | — | 0.8 |
| Ex. #4 | 3 | 70 | 0.95 | 0.7 |
| Ex. #5 | 1 | 65 | — | — |
| Ex. #6 | 10 | 77 | — | — |
| Ex. #7 | <1 | 77 | — | — |
| Ex. #8 | 2 | 65 | — | — |
| Ex. #9 | 15 | 90 | — | — |
| Ex. #10 | 3 | 70 | 0.95 | 0.7 |
| Ex. #11 | 5 | 65 | 0.9 | 0.95 |
| Type V | 5 | — | 1 | 0 |
| Envirostrip ™ | 6 | 85 | 0.25 | 1 |
| Blend of wheat starch/ CaCO₃ & acrylic | 30 | <50 | — | >3 |

Coating removal rate is compared to Type V media (arbitrary value of 1) Water uptake rate is compared to ENVIROSTRIP™, starch blase media (arbitrary value of 1)

The reaction product of this invention (Examples 1–11) is significantly softer than that of ENVIROSTRIP™, starch blast media stripping media, and yet is harder than the physical blended mixture of wheat starch/calcium carbonate and acrylic, clearly indicating that a reaction has taken place. The coating removal rate is significantly faster than would be predicted by the hardness. All of the media in Table 6 have essentially the same density. The prior art teachings would predict a coating removal rate of the examples which is less than that of ENVIROSTRIP™, starch blase media since the material of this invention is softer. Surprising however, the coating removal rate is much closer to the Type V abrasive, which is significantly harder than ENVIROSTRIP™, starch blast media.

Breakdown Rate

A comparison of the breakdown rates of four commercially available blast media was made with that of the new media as prepared by Example #10. The commercially available blast media included:

(1) ENVIROSTRIP™, starch blast media, purchased from ADM-Ogilvie, Montreal Quebec, a starch-based media prepared in accordance with the teachings of U.S. Pat. No. 5,066,335, U.S. Pat. No. 5,360,903 and U.S. Pat. No. 5,367,068, the media corresponding to the backbone polymeric material of this invention;

(2) Poly V plastic blast media purchased from U.S. Technology Corp., Canton, Ohio, an acrylate polymer with methyl methacrylate monomer, the media corresponding to the graft portion of the polymeric material of this invention;

(3) Type II Polyplus plastic blast media purchased from U.S. Technology Corp., Canton, Ohio, a urea-formaldehyde compound with cellulose filler; and (4) Type III plastic abrasive media purchased from U.S. Technology Corp., Canton, Ohio, a polymerized melamine molding material with alpha cellulose filler.

The particle size distribution of each of the blast media was determined before and after blasting and the results summarized in Table 7. The breakdown rates were calculated on both the commercial particle size distribution and on the 80 mesh screen.

The breakdown rate was determined by using a blast cabinet, 3'×3'×4' (w×h×d) without the vacuum return. At the bottom of the blast cabinet was a clap, which when opened, allowed all of the contents of the blast cabinet to be drained. The pressure pot, 1 cubic foot, was equipped with 2 glass view ports to verify that all of the media had been consumed. The air feed line was 1" I.D., and the media flow valve was of the guillotine type. Over the pressure pot was a hopper, without screens. The media was manually poured into the pressure pot via the hopper. The blast hose was 1" I.D., and about 8' long. The nozzle was ¼" straight barrel.

An aluminum plate was placed at 10 inches and 90° to the blast nozzle. The pressure at the nozzle was measured by inserting the needle gauge into the rubber hose directly behind the nozzle such that the needle was in the direction of the air flow. The media flow rate was measured by timing the consumption of 10 lbs of abrasive medial at the desired nozzle pressure. The particle size of the unblasted media was determined as was that of the media after 4 blast cycles.

TABLE 7

Comparative Breakdown Rates of Example #10, Starch Abrasive (Envirostrip ™)
and Plastic Abrasives (Poly V, PolyPlus & Type III)

| Mesh # | Before Blasting Example #10 | After 4 Cycles | Before Blasting ENVIROSTRIP ™ starch blast media 12/30 | After 4 Cycles | Before Blasting Poly V 20/40 | After 4 Cycles | Before Blasting PolyPlus 20/40 | After 4 Cycles | Before Blasting Type III 20/40 | After 4 Cycles |
|---|---|---|---|---|---|---|---|---|---|---|
| 16 | 0 | 0 | 33 | 0 | 0 | 0 | 0 | 0 | 0 | 0 |
| 20 | 3 | 0 | 52 | 7 | 10 | 5 | 5 | 1 | 0 | 0 |
| 30 | 41.6 | 6 | 10 | 16 | 40 | 31 | 59 | 16 | 20 | 5 |
| 40 | 31.4 | 17 | 5 | 23 | 44 | 37 | 36 | 32 | 74 | 36 |
| 50 | 13.2 | 22 | 0 | 19 | 6 | 14 | 3 | 23 | 7 | 27 |
| 60 | 3.8 | 15 | 0 | 11 | 0 | 4 | 0 | 10 | 0 | 10 |
| 80 | 2.2 | 18 | 0 | 11 | 0 | 3 | 0 | 9 | 0 | 9 |
| 100 | 0.2 | 7 | 0 | 5 | 0 | 2 | 0 | 3 | 0 | 4 |
| pan | 0 | 16 | 0 | 8 | 0 | 4 | 0 | 9 | 0 | 10 |
| lbs. used | 10 | | 10 | | 10 | | 10 | | 10 | |
| lbs. recovered | | 9.762 | | 9.754 | | 10 | | 7.978 | | 9.786 |
| breakdown rate on size (per cycle) | | 12.2% | | 19.1% | | 7.0% | | 15.0% | | 14.0% |
| breakdown rate on 80 (per cycle) | | 4.4% | | 3.8% | | 1.5% | | 7.4% | | 3.9% |

The breakdown rate was calculated according to military specification MIL-P-85891AS. The particle size distribution of Example #10 was narrow in the ground media as seen in Table II. About 86% of the media was on the 30, 40 and 50 mesh screens. After 4 cycles, the mean particle size shifted by one screen. About 72% was on the 40, 50, 60 and 80 mesh screens. The breakdown rate of Example #10 compared favorably to the breakdown rates of ENVIROSTRIP™, starch blast media 12/30, Poly V 20/40, PolyPlus 20/40 and Type III 20/40. The highest breakdown rate is that of ENVIROSTRIP™ starch blast media at 19.1% and the lowest is Poly V at 7%. Example #10 had a breakdown rate higher than Poly V, similar to PolyPlus and Type III, and lower than ENVIROSTRIP™, starch blast media.

Comparisons based solely on the new media size can be deceiving since most blast equipment only separates particles finer than 80 mesh from the blast medium. Based on breakdown below 80 mesh, the 4.4% breakdown of Example #10 compares favorably to the other four media. The highest breakdown rate being PolyPlus at 7.4%, and the lowest being Poly V at 1.5%. The two other media have breakdown rates of about 3–4%.

Almen Arc Height

In measuring the almen arc height, a block capable of holding 3 almen strips was used. Clad aluminum, 0.032" thick almen strips were used with a digital almen gauge. The pressure at the nozzle was measured by inserting a needle gauge into the rubber hose directly behind the nozzle such that the needle was in the direction of the air flow. The media flow rate was measured by timing the consumption of 10 lbs of abrasive media at the desired nozzle pressure. The arc of 3 unused almen strips was measured and recorded. The strips were placed into the block and secured without over tightening the holding screws.

For the single pass almen arc height, the following procedure was used. Immediately following the coating removal rate test, and without interruption, the almen block containing 3 almen strips was exposed to the blast using the same motion and technique used to remove the coating. The almen strips were removed from the block, wiped clean with a dry cloth and the arc remeasured and recorded.

For the saturation almen arc height, the almen block was blasted for 10 seconds at the preset pressure and media flow rate, at 7" stand-off and at 70°–85° impingement angle. The arc of each almen strip was measured and the almen strips were replaced in the block. These steps were repeated until no further significant change in almen arc was recorded.

Almen arc height is a measure of the residual stresses after blasting. The shot peening effect is detrimental to most aircraft skins. Therefore, the lower the almen arc height the better. Table 8 is a comparison of the almen arc heights of ENVIROSTRIP™, starch blast media, Type V and of Example #10 blast media. Example #10 of the present invention compared very favorably with the softer ENVIROSTRIP™, starch blast media product, and significantly better than the plastic Type V media.

TABLE 8

Single Pass and Saturation Almen Arc Heights
ENVIROSTRIP ™, Starch blast media, Type V and of Example #10

| Conditions | Ex. #10 | ENVIROSTRIP ™, Starch blast media 12/30 | Poly V 20/40 |
|---|---|---|---|
| 35 psi single | 0.0014" | | |
| 35 psi saturation | 0.0022" | | |
| 45 psi single | 0.0021" | | |
| 45 psi saturation | 0.0026" | | |
| 30 psi single | | 0.0006" | 0.0053" |
| 30 psi saturation | | 0.0032" | 0.0082" |

Almen strips were made from 2024-T3 clad aluminum

Coating Removal Rate

The coating removal rate was determined using a blast cabinet, 540 ×3'×5' (w×h×d), with vacuum return. At the bottom of the cyclone was a hopper with a clap, which when opened allowed all of the contents of the hopper to be drained. During blasting, the media and dust were separated in the cyclone. The media was collected in the hopper and the dust was collected in the bag house. Over the pressure pot, 3 cubic feet, was a hopper without screens. The media was manually filled into the hopper. The air feed line was 1' I.D., and the media flow valve was of the guillotine type.

Over the pressure pot was a hopper, without screens. The media was manually poured into the pressure pot via the hopper. The blast hose was 1" I.D., and about 8' long. The nozzle was ¼" straight barrel.

Panels with mil-C-83286 top coat and mil-P-23377 primer were used. The pressure at the nozzle was measured by inserting the needle gauge into the rubber hose directly behind the nozzle such that the needle was in the direction of the air flow. The media flow rate was determined by timing the consumption of 10 lbs of abrasive media at the desired nozzle pressure. Maintaining the nozzle at 7" and at 70°–85° angle, the paint was removed to the bare metal. As much paint as could be removed completely within one minute was removed. Without stopping, the single pass almen height samples were blasted. Both the surface area of paint removed as well as the exact time required to remove the paint was recorded in Table 9.

TABLE 9

Coating Rate Removal Comparison

| Media | Blast Press (psi) | Media Flow Rate (lbs/min) | Strip Rate (sq ft/min) |
| --- | --- | --- | --- |
| Example #10 | 40 | 12 | 0.45 |
| Type V | 20 to 45 | 12 | destroyed test panel |
| ENVIROSTRIP ™, Starch blast media 12/30 | 40 | 12 | 0.25 |

As with the almen arc height, the coating removal rate increased proportionally with the increase in blast pressure. The coating removal rate of Example #10 was similar to the coating removal rate of Type V and 10 times faster than ENVIROSTRIP™, starch blast media. Unlike ENVIROSTRIP™, Example #10 maintains the same blast properties from the first to the last blast cycle. Example #10 is three times faster than ENVIROSTRIP™ at its maximum efficiency.

All coating removal rate tests were performed using a ¼ inch diameter nozzle. This is smaller than the nozzles used to remove coatings from aircraft parts and components. Since the coating removal rate is dependent on the surface area of the nozzle, all other parameters remaining constant, the coating removal rate will increase by a factor of 4 when the nozzle diameter is doubled.

The coating removal rate of the humidified media did not change, indicating that the media is stable when stored under 95% R.H. at 33° C. conditions. This is significant in that coating removal rate is generally the most sensitive property to water uptake. As Example #10 absorbs water, it becomes softer. The almen arc height and hardness values will decrease. But the coating removal rate decreases before any changes in hardness or almen arc height are observed. Since none of the properties changed after 36 hours to high humidity conditions, the blast properties of the media are stable under most environmental conditions.

As with the almen arc height, the coating removal rate only showed a significant change when the media was dried at a temperature over 65° C.

Surface Roughness

The following are the surface roughness measurements which were obtained from panels on which the coating removal rate test was performed at 35 psi as shown in Table 10.

TABLE 10

Surface Roughness Comparison

| Media | Surface Roughness in μm | | | | |
| --- | --- | --- | --- | --- | --- |
| Example #10 | 0.93 | 0.91 | 1.01 | 0.72 | 0.89 |
| Example #10 | 0.98 | 0.96 | 0.94 | 0.98 | 0.92 |
| ENVIROSTRIP ™ starch blast media | 2.83 | 2.63 | 2.85 | 2.82 | 2.89 |
| ENVIROSTRIP ™ starch blast media | 2.88 | 3.06 | 2.45 | 2.83 | 2.79 |
| Type V | 9.55 | 9.07 | 9.78 | 9.21 | 10.02 |
| Type V | 9.92 | 9.35 | 9.11 | 9.81 | 9.57 |

The RA average surface roughness of clad aluminum panels stripped using Example #10 20/50 was 0.93 μm. This compared favorably with ENVIROSTRIP™, starch blast media (2.83 μm) and Poly V (9.35 μm). Since the surface roughness is so low, the cladding is disturbed the least with Example #10 than with other media. Also, since clad can be repolished after the paint was stripped with ENVIROSTRIP™, starch blast media, it should also be possible to repolish the clad substrate after stripping paint with Example #10.

Water Uptake Rate

In order to measure the water uptake rate of various blast media, a glass desiccator was used as a humidity chamber. A watch glass was used to expose the media to the environment inside the desiccator. Potassium sulfate ($K_2SO_4$) was used to maintain the humidity within the desiccator. A 25 g sample of the media was weighed and placed into a porcelain evaporating dish and placed in the desiccator for 13 hours, after which the media was removed and reweighed.

As shown in Table 11, the average free water content of Example #10 after 13 hours of conditioning at 97% R.H. was 0.2%. In contrast, the average free water content of ENVIROSTRIP™, starch blast media after 13 hours of conditioning increased by more than 10%. This increase is responsible for the observed drop in coating removal rate when ENVIROSTRIP™, starch blast media is used under very humid conditions.

Both Example #10 and ENVIROSTRIP™, starch blast media contain bound water. The bound water content is both difficult to measure with conventional means and is not lost easily. However, free water is included reversibly within the structure of both polymers. It is the free water which was studied here, and which is absorbed at a much slower rate by Example #10 than by ENVIROSTRIP™, starch blast media.

TABLE 11

Water Uptake Rate

| Media | T(°C.) | Time (hrs) | % mass gain |
| --- | --- | --- | --- |
| Ex. #10 | 25 | 13 | 0.22% |
| Ex. #10 | 25 | 13 | 0.21% |
| Ex. #10 | 25 | 13 | 0.21% |
| ENVIROSTRIP ™ starch blast media | 25 | 13 | 10.60% |

Discussion

The preparation of this type of blast media can incorporate any type of starch, the preferred starches are wheat and potato. In the specific examples discussed and described in the present invention, wheat, corn and potato starch were specifically used, however, it is recognized that any corn hybrid (waxy maize or high amylose corn), or any other starch source, such as rice or tapioca could be used. Additionally, the starch can be further modified or hydrolyzed and still be effective in this invention. While almost any oligomeric acrylic can be made to work, the preferred acrylic is water soluble. While any alkali earth metal will catalyze the reaction, calcium is preferred. It is also recognized that in addition to the alkali earth metals, various rare earth metals and other selected metals are also effective in the practice of this reaction. The preferred pH for the reaction is between 8–10, although any pH above 7 is effective in this reaction.

The unique aspect of this invention is that the product is not formed in significant quantities unless the temperature is raised above 95° C. As little as 20% starch and as much as 99% starch can be used. Likewise, as little as 1% acrylic and as much as 80% acrylic could be used. However, the most useful range is between 60–99% starch and between 1 and 40% acrylic. The catalyst can be used in concentrations ranging from 0.01% to 5%, while 0.1% to 1% is preferred.

One of the key aspects of this invention lies in the recognition that the use of oligomeric acrylic polymer can be used in place of acrylic monomer. When the monomer is used, two reactions are required to take place, acrylic monomer polymerization and esterification reaction to the polymer backbone. This necessitates the use of special solvents and catalysts. This invention eliminates the need to use a monomer polymerization reaction, and simply capitalizes on the fact that the monomer has already been polymerized and only the esterification reaction which attaches the oligomer to the polymer backbone needs to be effected. In a most preferred embodiment of this invention, the degree of polymerization of the acrylic oligomer is between 5,000 to 10,000 units. However, it is envisioned that larger and smaller degrees of polymerization will also be effective in this reaction. When the degree of polymerization becomes too large, the amount of steric hindrance which is present, becomes an obstacle to effective grafting reaction. Conversely, when the degree of polymerization is too small, the system becomes more like a monomer, thereby necessitating the use of special solvents and polymerization catalysts. It is believed that a less preferred range would encompass oligomeric units as low as 200 to 300 units and as high as 100,000 units or so.

The blast media of this invention performs at least as good as ENVIROSTRIP™, starch blast media, a commercially available wheat starch based abrasive media, in terms of surface finish and residual stresses on the surface. However, the coating removal rate is comparable to Type V plastic abrasive media. The performance characteristics of the media of this invention are less sensitive to water than prior art wheat starch based media.

Additionally, no preconditioning of the media was required and no observable static problems were discovered. Repeated blasting of the media did not result in any clinging to the sides of the blast cabinet or test panels. Significantly, less dust was observed during blasting when compared with any of the plastic media (Poly V, Poly Plus, or Type III). Therefore, while this new media is softer, it removes coatings faster, contrary to the teachings of the prior art.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof

What is claimed is:

1. A polymeric blast media comprising:

a starch polymer backbone;

an acrylic polymer which is grafted onto the starch polymer backbone, said blast media having a Shore D hardness of from about 65 to about 90, said acrylic polymer which is grafted onto the starch polymer backbone being of defined molecular weight.

2. The blast media of claim 1 wherein the starch is selected from the group consisting of wheat starch, corn starch, potato starch, rice, tapioca, high amylose corn.

3. The blast media of claim 2 wherein the starch is selected from the group consisting of wheat and potato.

4. The blast media of claim 1 wherein the acrylic is selected from the group consisting of acrylic and methacrylic polymers.

5. The blast media of claim 4 wherein the acrylic is methacrylic.

6. The blast media of claim 1 wherein the acrylic polymer is water soluble.

7. The blast media of claim 1 wherein the weight percent starch is from 20–99% and the weight percent acrylic is from 80–1%.

8. The blast media of claim 7 wherein the weight percent starch is from 40–99% and the weight percent acrylic is from 60–1%.

9. The blast media of claim 8 wherein the weight percent starch is at least 60–99% and the weight percent acrylic is from 30–1%.

10. A process for the preparation of a starch graft polyacrylate blast media comprising the steps of:

dispersing a starch polymer, an alkali earth metal catalyst and a water soluble acrylic polymer in an aqueous slurry;

heating the slurry to a temperature of at least 95° C.; and drying the slurry.

11. The process of claim 10 which further comprises the step of grinding the dried media.

12. The process of claim 11 wherein the pH is between 7–10 inclusive.

13. The process of claim 10 wherein the amount of alkali earth metal catalyst is from 0.01–5%.

14. The process of claim 13 wherein the amount of catalyst is from 0.1–1%.

15. The process of claim 10 wherein the alkali in the alkali earth metal catalyst is selected from the group consisting of Be, Mg, Ca, Sr, and Ba.

16. The process of claim 15 wherein the alkali is Ca.

17. A process for the preparation of a starch graft polyacrylate blast media comprising the steps of:

combining a starch polymer, an alkali earth metal catalyst and a water soluble acrylic polymer in one end of an extruder to form a mixture, the extruder having a temperature profile;

mixing and reacting the mixture by a mixing flight of screws in the extruder to form the blast media;

advancing and compressing the mixture by a conveying flight of screws in the extruder to a die; and cutting an extruded blast media into pellets.

18. The process of claim 17 wherein the temperature profile of the extruder and die ranges from 20° to 120° C.

* * * * *